United States Patent
Ren et al.

(10) Patent No.: US 11,723,076 B2
(45) Date of Patent: *Aug. 8, 2023

(54) METHOD AND APPARATUS FOR DETERMINING RA-RNTI

(71) Applicant: DATANG MOBILE COMMUNICATIONS EQUIPMENT CO., LTD., Beijing (CN)

(72) Inventors: Bin Ren, Beijing (CN); Zheng Zhao, Beijing (CN); Ren Da, Beijing (CN); Tie Li, Beijing (CN); Fang-Chen Cheng, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/497,987

(22) Filed: Oct. 11, 2021

(65) Prior Publication Data
US 2022/0030636 A1 Jan. 27, 2022

Related U.S. Application Data

(63) Continuation of application No. 16/646,559, filed as application No. PCT/CN2018/093408 on Jun. 28, 2018, now Pat. No. 11,178,701.

(30) Foreign Application Priority Data

Sep. 11, 2017 (CN) .......................... 201710812754.0

(51) Int. Cl.
*H04W 74/08* (2009.01)
*H04L 5/00* (2006.01)
(Continued)

(52) U.S. Cl.
CPC ....... *H04W 74/0833* (2013.01); *H04L 5/0007* (2013.01); *H04L 69/324* (2013.01); *H04W 72/23* (2023.01)

(58) Field of Classification Search
CPC ............................ H04W 72/23; H04L 5/0007
(Continued)

(56) References Cited

U.S. PATENT DOCUMENTS

2017/0013643 A1 1/2017 Nan et al.
2020/0275491 A1* 8/2020 Ren ..................... H04W 72/042

FOREIGN PATENT DOCUMENTS

| CN | 105409136 A | 3/2016 |
|----|-------------|--------|
| CN | 106416115 A | 2/2017 |
| EP | 2953415 A1 | 12/2015 |

(Continued)

OTHER PUBLICATIONS

NTT Docomo, "Discussion on scheduling of RAR", 3GPP TSG RAN WG1 Meeting #83, Anaheim, USA, Nov. 15-22, 2015, total 4 pages, R1 -157349.
(Continued)

*Primary Examiner* — Angel T Brockman
(74) *Attorney, Agent, or Firm* — Kilpatrick Townsend & Stockton, LLP

(57) ABSTRACT

Disclosed are a method and apparatus for determining an RA-RNTI. In the present application, a base station receives a random access preamble sent by a terminal; the base station determines an RA-RNTI according to a time-frequency resource occupied by the random access preamble, wherein the time-frequency resource is a time-frequency resource of an orthogonal frequency division multiplexing (OFDM) symbol level; and the base station sends a random access response message, wherein the random access response message comprises downlink control information allocated, by the base station, for the terminal, and the downlink control information is scrambled using the RA-
(Continued)

RNTI. By means of the present application, an RA-RNTI can be determined during a random access process of an NR system.

20 Claims, 3 Drawing Sheets

(51) Int. Cl.
  *H04W 72/23* (2023.01)
  *H04L 69/324* (2022.01)
(58) Field of Classification Search
  USPC .......................................................... 370/329
  See application file for complete search history.

(56) References Cited

FOREIGN PATENT DOCUMENTS

| JP | 2015142373 A | 8/2015 |
|---|---|---|
| WO | 2017132910 A1 | 8/2017 |
| WO | 2018226026 A1 | 12/2018 |

OTHER PUBLICATIONS

CATT,"Random Access Procedure", 3GPP TSG-RAN WG2 Meeting #NR AH2, Qingdao, China, Jun. 27-29, 2017, total 5 pages, R2-1706366.
LG Electronics,"On four-step RACK procedure", 3GPP TSG RAN WG1 Meeting #90, Prague, Czech Republic, Aug. 21-25, 2017, total 6 pages, R1-1713131.
Ericsson,"4-step random access procedure", 3GPP TSG RAN WG1 Meeting #90, Prague, Czech Republic, Aug. 21-25, 2017, total 21 pages, R1-1714043.
Interdigital, Inc.,"RACH configuration of Multiple Msg1 transmissions before then end of a monitored RAR window", 3GPP TSG-RAN WG1 Meeting #90, Prague, Czech Republic, Aug. 21-25, 2017, total 4 pages, R1-1714110.
CATT,"Further details on NR 4-step RA Procedure", 3GPP TSG RAN WG1 Meeting NR#3, Nagoya, Japan, 18th-21 st, Sep. 2017, total 14 pages, R1-1715790.
Huawei et al., "Calculation of RA-RNT!", 3GPP TSG-RAN WG2 Meeting #99, Berlin, Germany, Aug. 21 -25, 2017, total 2 pages, R2-1708968.

* cited by examiner

METHOD AND APPARATUS FOR DETERMINING RA-RNTI

The present application is a continuation of U.S. patent application Ser. No. 16/646,559, filed Jun. 28, 2018, which claims priority to Chinese Patent Application No. 201710812754.0, filed with the China National Intellectual Property Administration on Sep. 11, 2017 and entitled "Method and Apparatus for Determining RA-RNTI". The disclosure of the above application is incorporated herein by reference.

FIELD

The present application relates to the field of wireless communication technologies, and particularly to a method and apparatus for determining a Random Access-Radio Network Temporary Identifier (RA-RNTI) in the random access process.

BACKGROUND

The random access process refers to a process from a terminal transmitting a random access preamble to attempt to access a wireless network to the terminal establishing a basic signaling connection with the network. In the random access process, after transmitting the random access preamble, the terminal monitors a Random Access Response (RAR, also called Msg2) message scheduled by the base station through a Physical Downlink Control Channel (PDCCH). The base station transmits the uplink resources allocated to the terminal to the terminal through the Downlink Control Information (DCI) in the RAR message. The Cyclic Redundancy Check (CRC) of the DCI is scrambled by the RA-RNTI. The terminal uses the RA-RNTI to descramble the received DCI to obtain the uplink resources allocated by the base station.

In the Long Term Evolution (LTE) of 4G system, the RA-RNTI is a function related to time and frequency. For the non-BL/CE (Bandwidth-reduced Low-complexity/Coverage-Enhancement) terminal, the RA-RNTI is given by the formula of:

$$\text{RA-RNTI} = 1 + t\_id + 10 * f\_id \qquad [1]$$

wherein t_id is the index of the first subframe of the Physical Random Access CHannel (PRACH) in the time domain, and f_id is the index of the frequency domain bandwidth occupied by the PRACH.

In the 5G new wireless communication (NR) system, there are two types of random access preamble formats: long sequence (L=839) and short sequence (L=139 or 127), wherein the preamble format of the short sequence is as shown in Table 1:

TABLE 1

Preamble format of NR short sequence (subcarrier spacing = 15/30/60/120 KHz)

| Preamble format | | Number of OFDM symbols contained in each random access preamble sequence | TCP | TSEQ | TGP | Path delay (Path profile) (Ts) | Path delay (Path profile) (us) | Largest cell radius (meter) | Case |
|---|---|---|---|---|---|---|---|---|---|
| A | 0 | 1 | 144 | 2048 | 0 | 48 | 1.56 | 469 | TA is known or small cell |
|   | 1 | 2 | 288 | 4096 | 0 | 96 | 3.13 | 938 | Small cell |
|   | 2 | 4 | 576 | 8192 | 0 | 144 | 4.69 | 2,109 | Normal cell |
|   | 3 | 6 | 864 | 12288 | 0 | 144 | 4.69 | 3,516 | Normal cell |
| B | 1 | 2 | 216 | 4096 | 72 | 96 | 3.13 | 469 | Small cell |
|   | 2 | 4 | 360 | 8192 | 216 | 144 | 4.69 | 1,055 | Normal cell |
|   | 3 | 6 | 504 | 12288 | 360 | 144 | 4.69 | 1,758 | Normal cell |
|   | 4 | 12 | 936 | 24576 | 792 | 144 | 4.69 | 3,867 | Normal cell |
| C | 0 | 1 | 1240 | 2048 | 0 | 144 | 4.69 | 5300 | Normal cell |
|   | 2 | 4 | 2048 | 8192 | 2916 | 144 | 4.69 | 9200 (1160 when subcarrier spacing is 120 KHz) | Normal cell |

In Table 1, for the subcarrier spacing = 15 KHz, Ts = 1/30720 ms; for SCS = 30 KHz, Ts = 1/(2 * 30720) ms; for SCS = 60 KHz, Ts = 1/(4 * 30720) ms; for SCS = 120 KHz, Ts = 1/(8 * 30720) ms.

In the NR system, for the preamble format of the short sequence, since a slot may contain multiple PRACH preamble sequences and the number of slots contained in a 10 ms radio frame varies for different subcarrier spacings, it is impossible to calculate the RA-RNTI using the existing formula of the LTE.

Therefore, it is urgent to define the method of calculating the RA-RNTI for the random access process of the NR system.

SUMMARY

An embodiment of the present application provide a method and apparatus for determining the RA-RNTI.

In a first aspect, a method for determining an RA-RNTI is provided, including:

receiving, by a base station, a random access preamble transmitted by a terminal;

determining, by the base station, an RA-RNTI according to time-frequency resources occupied by the random access preamble, wherein the time-frequency resources are time-frequency resources in OFDM symbol level;

transmitting, by the base station, a random access response message, wherein the random access response message includes downlink control information allocated by the base station for the terminal, and the downlink control information is scrambled by using the RA-RNTI.

In one embodiment, the RA-RNTI is determined according to time domain resource related parameters and frequency domain resource related parameters of the time-frequency resources occupied by the preamble; wherein the time domain resource related parameters include: an index of a first OFDM symbol occupied by the random access preamble in its slot, and an index of a slot occupied by the random access preamble in its radio frame; the frequency domain resource related parameters include: an index of a frequency domain bandwidth occupied by a PRACH corrected based on a coefficient; the coefficient is determined according to the number of slots in a subframe and the number of OFDM symbols in a slot, and the PRACH is used to transmit the random access preamble.

In one embodiment, the calculation formula of the RA-RNTI is:

$$RA\text{-}RNTI=1+start\_symbol\_index\_in\_slot+\\ slot\_id*N\_symbol\_per\_slot+\\ 10*N\_slot\_per\_subframe*N\_symbol\_per\_slot*f\_id$$

wherein:

start_symbol_index_in_slot is the index of the first OFDM symbol occupied by the random access preamble in its slot;

slot_id is the index of the slot occupied by the random access preamble in its radio frame;

N_symbol_per_slot represents the number of OFDM symbols in a slot;

N_slot_per_subframe represents the number of slots in a subframe;

f_id is the index of the frequency domain bandwidth occupied by a PRACH.

In one embodiment, the RA-RNTI is determined according to time domain resource related parameters and frequency domain resource related parameters of the time-frequency resources occupied by the preamble; wherein the time domain resource related parameters include: the index of the random access preamble sequence in the slot occupied by the random access preamble, the number of OFDM symbols contained in the random access preamble sequence, and the index of the slot occupied by the random access preamble in its radio frame, wherein the index of the first OFDM symbol occupied by the random access preamble in its slot corresponds to the slot occupied by the random access preamble, and the number of OFDM symbols contained in the random access preamble sequence corresponds to the format of the random access preamble sequence; the frequency domain resource related parameters include: the index of the frequency domain bandwidth occupied by a PRACH corrected based on a coefficient; the coefficient is determined according to the number of slots in a subframe and the number of OFDM symbols in a slot, and the PRACH is used to transmit the random access preamble.

In one embodiment, the calculation formula of the RA-RNTI is:

$$RA\text{-}RNTI=1+sequence\_id\_per\_slot*N\_OS+\\ slot\_id*N\_symbol\_per\_slot+\\ 10*N\_slot\_per\_subframe*N\_symbol\_per\_slot*f\_id$$

wherein:

sequence_id_per_slot is the index of the random access preamble sequence in the slot occupied by the random access preamble; wherein the correspondence between the slots and the indexes of the random access preambles is pre-configured or pre-agreed;

N_OS is the number of OFDM symbols contained in a random access preamble sequence; wherein the N_OS is pre-configured or pre-agreed, and different random access preamble sequences correspond to different N_OSs;

slot_id is the index of the slot occupied by the random access preamble in its radio frame;

N_symbol_per_slot represents the number of OFDM symbols in a slot;

N_slot_per_subframe represents the number of slots in a subframe;

f_id is the index of the frequency domain bandwidth occupied by a PRACH.

In one embodiment, the RA-RNTI is determined according to time domain resource related parameters and frequency domain resource related parameters of the time-frequency resources occupied by the preamble; wherein the time domain resource related parameters include: the index of the random access preamble sequence in the slot occupied by the random access preamble, the total number of random access preamble sequences in the slot occupied by the random access preamble, and the index of the slot occupied by the random access preamble in its radio frame, wherein the index of the first OFDM symbol occupied by the random access preamble in its slot corresponds to the slot occupied by the random access preamble, and the total number of random access preamble sequences in the slot occupied by the random access preamble corresponds to the slot index; the frequency domain resource related parameters include: the index of the frequency domain bandwidth occupied by a PRACH corrected based on a coefficient; the coefficient is determined according to the number of slots in a subframe and the number of OFDM symbols in a slot, and the PRACH is used to transmit the random access preamble.

In one embodiment, the calculation formula of the RA-RNTI is:

$$RA\text{-}RNTI=1+sequence\_id\_per\_slot+\\ slot\_id*N\_sequence\_per\_slot+\\ 10*N\_slot\_per\_subframe*N\_symbol\_per\_slot*f\_id$$

wherein:

sequence_id_per_slot is the index of the random access preamble sequence in the slot occupied by the random access preamble; wherein the correspondence between the slots and the indexes of the random access preambles is pre-configured or pre-agreed;

N_sequence_per_slot is the total number of random access preamble sequences in the slot occupied by the random access preamble; wherein N_sequence_per_slot corresponds to the slot, and the total number of random access preamble sequences in a slot is pre-configured or pre-agreed;

slot_id is the index of the slot occupied by the random access preamble in its radio frame;

N_symbol_per_slot represents the number of OFDM symbols in a slot;

N_slot_per_subframe represents the number of slots in a subframe;

f_id is the index of the frequency domain bandwidth occupied by a PRACH.

In a second aspect, a method for determining an RA-RNTI is provided, including:

transmitting, by a terminal, a random access preamble sequence to a base station;

determining, by the terminal, an RA-RNTI according to time-frequency resources occupied by the random access preamble sequence, wherein the time-frequency resources are time-frequency resources in OFDM symbol level;

receiving, by the terminal, a random access response message transmitted by the base station, and descrambling downlink control information contained in the random access response message by using the RA-RNTI.

In one embodiment, the RA-RNTI is determined according to time domain resource related parameters and frequency domain resource related parameters of the time-frequency resources occupied by the preamble; wherein the time domain resource related parameters include: an index of a first OFDM symbol occupied by the random access preamble in its slot, and an index of a slot occupied by the random access preamble in its radio frame; the frequency domain resource related parameters include: an index of a frequency domain bandwidth occupied by a PRACH corrected based on a coefficient; the coefficient is determined according to the number of slots in a subframe and the number of OFDM symbols in a slot, and the PRACH is used to transmit the random access preamble.

In one embodiment, the calculation formula of the RA-RNTI is:

RA-RNTI=1+start_symbol_index_in_slot+
slot_id*$N$_symbol_per_slot+
10*$N$_slot_per_subframe*$N$_symbol_per_slot*$f$_id wherein:
start_symbol_index_in_slot is the index of the first OFDM symbol occupied by the random access preamble in its slot;
slot_id is the index of the slot occupied by the random access preamble in its radio frame;
N_symbol_per_slot represents the number of OFDM symbols in a slot;
N_slot_per_subframe represents the number of slots in a subframe;
f_id is the index of the frequency domain bandwidth occupied by a PRACH.

In one embodiment, the RA-RNTI is determined according to time domain resource related parameters and frequency domain resource related parameters of the time-frequency resources occupied by the preamble;
wherein the time domain resource related parameters include: the index of the random access preamble sequence in the slot occupied by the random access preamble, the number of OFDM symbols contained in the random access preamble sequence, and the index of the slot occupied by the random access preamble in its radio frame, wherein the index of the first OFDM symbol occupied by the random access preamble in its slot corresponds to the slot occupied by the random access preamble, and the number of OFDM symbols contained in the random access preamble sequence corresponds to the format of the random access preamble sequence;
the frequency domain resource related parameters include: the index of the frequency domain bandwidth occupied by a PRACH corrected based on a coefficient; the coefficient is determined according to the number of slots in a subframe and the number of OFDM symbols in a slot, and the PRACH is used to transmit the random access preamble.

In one embodiment, the calculation formula of the RA-RNTI is:

RA-RNTI=1+sequence_id_per_slot*$N$_OS+
slot_id*$N$_symbol_per_slot+
10*$N$_slot_per_subframe*$N$_symbol_per_slot*$f$_id wherein:
sequence_id_per_slot is the index of the random access preamble sequence in the slot occupied by the random access preamble; wherein the correspondence between the slots and the indexes of the random access preambles is pre-configured or pre-agreed;
N_OS is the number of OFDM symbols contained in a random access preamble sequence; wherein the N_OS is pre-configured or pre-agreed, and different random access preamble sequences correspond to different N_OSs;
slot_id is the index of the slot occupied by the random access preamble in its radio frame;
N_symbol_per_slot represents the number of OFDM symbols in a slot;
N_slot_per_subframe represents the number of slots in a subframe;
f_id is the index of the frequency domain bandwidth occupied by a PRACH.

In one embodiment, the RA-RNTI is determined according to time domain resource related parameters and frequency domain resource related parameters of the time-frequency resources occupied by the preamble; wherein the time domain resource related parameters include: the index of the random access preamble sequence in the slot occupied by the random access preamble, the total number of random access preamble sequences in the slot occupied by the random access preamble, and the index of the slot occupied by the random access preamble in its radio frame, wherein the index of the first OFDM symbol occupied by the random access preamble in its slot corresponds to the slot occupied by the random access preamble, and the total number of random access preamble sequences in the slot occupied by the random access preamble corresponds to the slot index; the frequency domain resource related parameters include: the index of the frequency domain bandwidth occupied by a PRACH corrected based on a coefficient; the coefficient is determined according to the number of slots in a subframe and the number of OFDM symbols in a slot, and the PRACH is used to transmit the random access preamble.

In one embodiment, the calculation formula of the RA-RNTI is:

RA-RNTI=1+sequence_id_per_slot+
slot_id*$N$_sequence_per_slot+
10*$N$_slot_per_subframe*$N$_symbol_per_slot*$f$_id wherein:
sequence_id_per_slot is the index of the random access preamble sequence in the slot occupied by the random access preamble; wherein the correspondence between the slots and the indexes of the random access preambles is pre-configured or pre-agreed;
N_sequence_per_slot is the total number of random access preamble sequences in the slot occupied by the random access preamble; wherein N_sequence_per_slot corresponds to the slot, and the total number of random access preamble sequences in a slot is pre-configured or pre-agreed;
slot_id is the index of the slot occupied by the random access preamble in its radio frame;
N_symbol_per_slot represents the number of OFDM symbols in a slot;
N_slot_per_subframe represents the number of slots in a subframe;
f_id is the index of the frequency domain bandwidth occupied by a PRACH.

In a third aspect, a base station is provided, including:
a receiving module configured to receive a random access preamble transmitted by a terminal;
a determining module configured to determine an RA-RNTI according to time-frequency resources occupied by the random access preamble, wherein the time-frequency resources are time-frequency resources in OFDM symbol level;

a transmitting module configured to transmit a random access response message, wherein the random access response message includes downlink control information allocated by the base station for the terminal, and the downlink control information is scrambled by using the RA-RNTI.

In a fourth aspect, a terminal is provided, including:

a transmitting module configured to transmit a random access preamble sequence to a base station;

a determining module configured to determine an RA-RNTI according to time-frequency resources occupied by the random access preamble sequence, wherein the time-frequency resources are time-frequency resources in OFDM symbol level;

a receiving module configured to receive a random access response message transmitted by the base station, and descramble downlink control information contained in the random access response message by using the RA-RNTI.

In a fifth aspect, a communication device is provided, including: a processor, a memory, a transceiver and a bus interface; the processor is configured to read the programs in the memory and perform the process of:

receiving a random access preamble transmitted by a terminal via the transceiver;

determining an RA-RNTI according to time-frequency resources occupied by the random access preamble, wherein the time-frequency resources are time-frequency resources in OFDM symbol level;

transmitting a random access response message via the transceiver, wherein the random access response message includes downlink control information allocated by the base station for the terminal, and the downlink control information is scrambled by using the RA-RNTI.

In a sixth aspect, a communication device is provided, including: a processor, a memory, a transceiver and a bus interface; the processor is configured to read the programs in the memory and perform the process of:

transmitting a random access preamble sequence to a base station via the transceiver;

determining an RA-RNTI according to time-frequency resources occupied by the random access preamble sequence, wherein the time-frequency resources are time-frequency resources in OFDM symbol level;

receiving a random access response message transmitted by the base station via the transceiver, and descrambling downlink control information contained in the random access response message by using the RA-RNTI.

In a seventh aspect, a computer storage medium is provided, where the computer readable storage medium stores the computer executable instructions configured to cause the computer to perform any method in the first aspect described above.

In an eighth aspect, a computer storage medium is provided, where the computer readable storage medium stores the computer executable instructions configured to cause the computer to perform any method in the second aspect described above.

In the above embodiments of the present application, the RA-RNTI may be determined according to the time-frequency resources occupied by the random access preamble, and the time-frequency resources are the time-frequency resources in OFDM symbol level. Since the RA-RNTI is calculated based on the time-frequency resources in OFDM symbol level occupied by the random access preamble, for the NR system, the time interval of the random access preamble may be based on the OFDM symbol level in many cases of the preamble format of the short sequence and the subcarrier spacing, implementing the determination of the RA-RNTI in the random access process of the NR system.

DETAILED DESCRIPTION

In the following, some terms in the embodiments of the present application are explained so as to facilitate the understanding of those skilled in the art.

(1) In the embodiments of the present application, the nouns "network" and "system" are often used alternately, but those skilled in the art may understand the meaning thereof (2) The term "a plurality of" in the embodiments of the present application refers to two or more, and other quantifiers are similar thereto.

(3) "and/or" describes the association relationship of the associated objects, and indicates that there may be three relationships, for example, A and/or B may represent: only A, both A and B, and only B. The character "I" generally indicates that the associated objects have a kind of "or" relationship.

The technical solution in the embodiments of the present application will be described below clearly and completely in combination with the figures in the embodiments of the present application.

Figure 1:
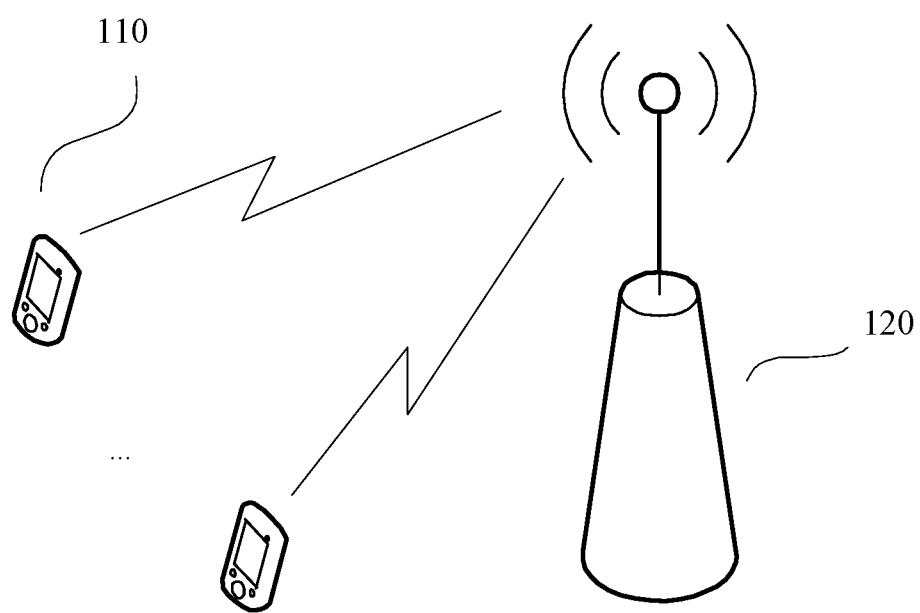
FIG. 1 is a schematic diagram of a network architecture applicable to the embodiments of the present application.

FIG. 1 exemplarily shows a schematic diagram of a possible communication scenario in accordance with an embodiment of the present application. As shown in FIG. 1, a terminal 110 accesses a wireless network through a Radio Access Network (RAN) node 120, to obtain the services of the external network (such as the Internet) through the wireless network or communicate with other terminals through the wireless network.

Here, the terminal is also called User Equipment (UE), Mobile Station (MS), Mobile Terminal (MT), etc., and is a device for providing the voice and/or data connectivity to the user, e.g., a handheld device with the wireless connection function, a vehicle-carried device, etc. At present, some examples of the terminal are: mobile phone, tablet, laptop, palmtop computer, Mobile Internet Device (MID), wearable device, Virtual Reality (VR) device, Augmented Reality (AR) equipment, wireless terminal in the industrial control, wireless terminal in the self driving, wireless terminal in the remote medical surgery, and wireless terminal in the smart grid, wireless terminal in the transportation safety, wireless terminal in the smart city, wireless terminal in the smart home, etc.

The RAN is the part in the network that connects the terminal to the wireless network. The RAN node (or device) is a node (or device) in the radio access network, and may also be called a base station. At present, some examples of the RAN node are: gNB, Transmission Reception Point (TRP), evolved Node B (eNB), Radio Network Controller (RNC), Node B (NB), Base Station Controller (BSC), Base Transceiver Station (BTS), home base station (e.g., home evolved NodeB, or Home Node B (HNB)), Base Band Unit (BBU), or Wireless fidelity (Wifi) Access Point (AP). In addition, in a network structure, the RAN may include a Centralized Unit (CU) node and Distributed Unit (DU) nodes. This structure splits the protocol layer of the eNB in the Long Term Evolution (LTE) system, where some functions of the protocol layer are centrally controlled in the CU, and the remaining part or all of the functions of the protocol layer are distributed in the DUs which are centrally controlled in the CU.

The network architecture described in the embodiments of the present application is for the purpose of illustrating the technical solutions of the embodiments of the present application more clearly, but not a limitation on the technical solutions provided in the embodiments of the present application. As can be known by those ordinary skilled in the art, with the evolution of the network architecture, the technical solutions provided in the embodiments of the present application are also applicable to the similar technical problems.

For the NR system, due to the presence of the preamble format of the short sequence and also the presence of many cases of subcarrier spacing, the time interval of the random access preamble is based on the Orthogonal Frequency Division Multiplexing (OFDM) symbol level. Therefore, the RA-RNTI cannot be calculated based on the time-frequency resources in subframe level occupied by the random access preamble. In order to solve this problem, in the embodiments of the present application, the RA-RNTI is calculated according to the time-frequency resources at OFDM symbol level occupied by the random access preamble.

Further, in order to reduce the frequency domain resource overhead of the PRACH in the NR system, when the time domain and frequency domain resources related to the RA-RNTI are configured, the method of configuring the time domain resources and then the frequency domain resources is used, that is, only when all the time domain resources on the given frequency domain resource have been configured, the time domain resources on the next available frequency domain resource are configured.

The embodiments of the present application may be applicable to the calculation of the RA-RNTI corresponding to the short-sequence random access preamble in the NR system, and of course, it may also be applicable to the calculation of the RA-RNTI corresponding to the long-sequence random access preamble.

The embodiments of the present application provide the following three methods for calculating the RA-RNTI.

First Method

In the first method, the time domain resource related parameters used to calculate the RA-RNTI may include: the index of the first symbol occupied by the random access preamble in its slot, and the index of the slot occupied by the random access preamble in its radio frame; and the frequency domain resource related parameters used to calculate the RA-RNTI may include the index of the frequency domain bandwidth occupied by the PRACH corrected based on a coefficient, where the coefficient may be determined according to the number of slots in a subframe and the number of symbols in a slot.

The following formula (2) exemplarily shows a method for calculating the RA-RNTI based on the first method:

$$RA\text{-}RNTI = 1 + start\_symbol\_index\_in\_slot + slot\_id * N\_symbol\_per\_slot + 10 * N\_slot\_per\_subframe * N\_symbol\_per\_slot * f\_id \quad [2].$$

Wherein:

start_symbol_index_in_slot is the index of the first OFDM symbol occupied by the random access preamble in its slot. For example, there are at most 14 OFDM symbols in a slot and the index values of the OFDM symbols are numbered sequentially from 0. The value range of start_symbol_index_in_slot is [0,13]. At the base station side, the base station may obtain the value of start_symbol_index_in_slot by detecting the time-frequency resource position of the random access preamble;

slot_id is the index of the slot occupied by the random access preamble in its 10 ms radio frame. The indexes of slots in a 10 ms radio frame may be numbered sequentially from 1. At the base station side, the base station may obtain the value of slot_id by detecting the time-frequency resource position of the random access preamble;

N_symbol_per_slot is the number of OFDM symbols in a slot. For the case where the subcarrier spacing is 15 KHz, 30 KHz, 60 KHz or 120 KHz, the value of N_symbol_per_slot is 14. The value of N_symbol_per_slot is known to both the base station and the terminal;

N_slot_per_subframe represents the number of slots in a 1 ms subframe, and its value is related to the size of the subcarrier spacing. For example, when the subcarrier spacing is 15 KHz, the value of N_slot_per_subframe is 1; when the subcarrier spacing is 30 KHz, the value of N_slot_per_subframe is 2; when the subcarrier spacing is 60 KHz, the value of N_slot_per_subframe is 4; when the subcarrier spacing is 120 KHz, the value of N_slot_per_subframe is 8. The value of N_symbol_per_slot is known to both the base station and the terminal;

f_id is the index of a frequency domain bandwidth occupied by a PRACH. There is a mapping relationship between PRACHs and RACHs, and the terminal transmits the random access preamble on the RACH. The frequency domain bandwidth occupied by the PRACH may be pre-agreed, and is known to both the base station and the terminal.

Second Method

In the second method, the time domain resource related parameters used to calculate the RA-RNTI may include: the index of the random access preamble sequence in the slot occupied by the random access preamble (this index corresponds to the slot occupied by the random access preamble), the number of OFDM symbols contained in the random access preamble sequence (the number of symbols corresponds to the format of the random access preamble sequence), and the index of the slot occupied by the random access preamble in its radio frame; and the frequency domain resource related parameters used to calculate the RA-RNTI may include the index of the frequency domain bandwidth occupied by the PRACH corrected based on a coefficient, where the coefficient may be obtained according to the number of slots in a subframe and the number of symbols in a slot.

The following formula (3) exemplarily shows a method for calculating the RA-RNTI based on the second method:

$$RA\text{-}RNTI=1+sequence\_id\_per\_slot*N\_OS+ \\ slot\_id*N\_symbol\_per\_slot+ \\ 10*N\_slot\_per\_subframe*N\_symbol\_per\_slot*f\_id \quad [3].$$

Wherein:

sequence_id_per_slot is the index of the random access preamble sequence in the slot occupied by the random access preamble. Here, the correspondence between the slots and the indexes of the random access preambles is pre-configured or pre-agreed. At the base station side, the base station may obtain the slot (slot_id) occupied by the random access preamble and the corresponding value of sequence_id_per_slot by detecting the time-frequency resource position of the random access preamble.

N_OS is the number of OFDM symbols contained in a random access preamble sequence, and its value range is 1, 2, 4, 6, and 12; wherein the N_OS is pre-configured or pre-agreed. Its value is related to the format of the random access preamble. For different formats of the short-sequence random access preamble, for example, the values of N_OS may be seen in Table 1. At the base station side, the base station may determine the corresponding random access preamble format according to the detected time-frequency resources occupied by the random access preamble (the correspondence between the time-frequency resources of the random access preamble and the used format may be pre-configured or pre-agreed), and then determine the corresponding value of N_OS according to the random access preamble format.

The meanings of slot_id, N_symbol_per_slot, N_slot_per_subframe, and f_id are the same as those in the first method.

Third Method

In the third method, the time domain resource related parameters used to calculate the RA-RNTI may include: the index of the random access preamble sequence in the slot occupied by the random access preamble, the index of the slot occupied by the random access preamble in its radio frame, and the number of OFDM symbols in a slot; and the frequency domain resource related parameters used to calculate the RA-RNTI may include the index of the frequency domain bandwidth occupied by the PRACH corrected based on a coefficient, where the coefficient may be obtained according to the number of slots in a subframe and the number of symbols in a slot.

The following formula (4) exemplarily shows a method for calculating the RA-RNTI based on the third method:

$$RA\text{-}RNTI=1+sequence\_id\_per\_slot+ \\ slot\_id*N\_sequence\_per\_slot+ \\ 10*N\_slot\_per\_subframe*N\_symbol\_per\_slot*f\_id \quad [4].$$

Wherein:

N_sequence_per_slot is the total number of random access preamble sequences in the slot occupied by the random access preamble. Here, there is a correspondence between the index of the slot (slot_id) and N_sequence_per_slot, and the value of N_sequence_per_slot of a slot is pre-configured or pre-agreed. At the base station side, the base station may obtain the index of the slot (slot_id) occupied by the random access preamble by detecting the time-frequency resource position of the random access preamble, and then determine the corresponding value of N_sequence_per_slot according to the slot_id.

The meanings of sequence_id_per_slot, slot_id, N_symbol_per_slot, N_slot_per_subframe, and f_id are the same as those in the first method.

Figure 2:
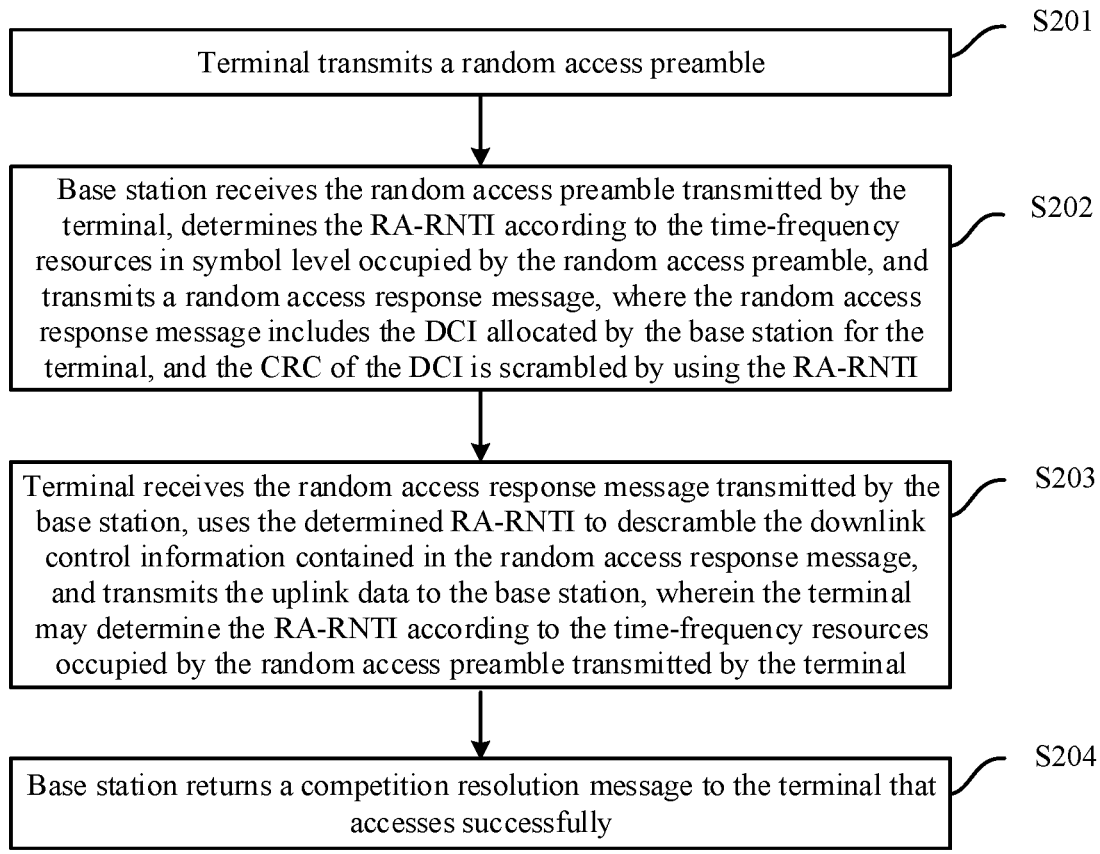
FIG. 2 is a schematic diagram of a random access process in accordance with an embodiment of the present application.

Referring to FIG. 2, it is a random access process according to an embodiment of the present application. As shown, the process may include the following steps.

S201: a terminal transmits a random access preamble. The message transmitted in this step is also called Msg1. The Msg1 may be transmitted on a Random Access CHannel (RACH), and there is a mapping relationship between RACHs and PRACHs.

S202: a base station receives the random access preamble transmitted by the terminal, determines the RA-RNTI according to the time-frequency resources in symbol level occupied by the random access preamble, and transmits a random access response message, which is also called Msg2 message. The random access response message includes the Downlink Control Information (DCI) allocated by the base station for the terminal, and the CRC of the DCI is scrambled by using the RA-RNTI.

Specifically, the base station may calculate the RA-RATI by using the method described in the above embodiments.

In this step, the DCI may include the following information: the index of the random access preamble received by the base station, the Time Adjustment (TA) of the uplink transmission, scheduling information of Physical Uplink Shared CHannel (PUSCH), and the allocated Cell Radio Network Temporary Identifier (C-RNTI).

S203: the terminal receives the random access response message transmitted by the base station, and uses the determined RA-RNTI to descramble the downlink control information contained in the random access response message. Here, the terminal may use the method provided in the above embodiments to determine the RA-RNTI according to the time-frequency resources occupied by the random access preamble transmitted by the terminal.

Further, for the contention based random access process, S203 may further include: the terminal transmits the uplink data according to the scheduling information and TA information carried in the random access response. The message transmitted in this step is called Msg3 which contains the unique ID of the terminal, namely TMSI, and contains the Radio Resource Control (RRC) connection request generated by the RRC layer of the terminal.

Further, for the contention based random access process, after S203, the process may further include: S205, the base station returns a contention resolution message (also called Msg4 message) to the terminal that accesses successfully after receiving the Msg3 message from the terminal. The Msg4 message contains the unique ID (such as C-RNTI) of the terminal that accesses successfully and the RRC connection establishment response which is generated by the RRC layer of the base station.

In order to understand the embodiments of the present application more clearly, three methods of calculating the RA-RNTI according to the formulas (2), (3), and (4) in the embodiments of the present application will be described below respectively in combination with three specific application scenarios and the process shown in FIG. 2.

First Scenario

This scenario describes an example of calculating the RA-RNTI by using the first method described above. The configuration table of the number of random access preambles as shown in Table 2 may be pre-configured at the base station and the terminal.

TABLE 2

| PRACH Configuration Index | Preamble Format (A0/A1/A2/A3/B1/B2/B3/B4/C0/C2) | System frame number | slot_id (1~10) | start_symbol_index_in_slot (0~13) |
|---|---|---|---|---|
| 0 | 0 | Even | 1 | 0 |
| 1 | 0 | Even | 4 | 1 |
| 2 | 0 | Even | 7 | 2 |
| 3 | 0 | Any | 1 | 3 |
| 4 | 0 | Any | 4 | 4 |
| 5 | 0 | Any | 7 | 5 |
| 6 | 0 | Any | 1, 6 | 6 |
| 7 | 0 | Any | 2, 7 | 7 |
| 8 | 0 | Any | 3, 8 | 8 |
| ... | ... | ... | ... | ... |
| ... | ... | ... | ... | ... |
| ... | ... | ... | ... | ... |

The above Table 2 defines the slot occupied by the random access preamble sequence and the first OFDM symbol occupied in the slot.

The subcarrier spacing is 15 KHz as an example in this scenario, and in this case, N_slot_per_subframe=1, N_symbol_per_slot=14, and the value range of start_symbol_index_in_slot is 0~13. In this way, the formula (2) is simplified as the following formula (5):

RA-RNTI=1+start_symbol_index_in_slot+slot_id*14+10*14*f_id.

Based on the process shown in FIG. 2, in this scenario, the following steps are performed.

In S201, the terminal may determine the transmitting resources of the random access preamble according to Table 2, for example, may transmit the random access preamble sequence 0 starting from the OFDM symbol 0 in the slot 1, or transmit the random access preamble sequence 1 starting from the OFDM symbol 1 in the slot 4. The transmitted random access preamble may be in any format.

In S202, the base station detects the time-frequency resources occupied by the random access preamble transmitted by the terminal, to obtain slot_id and start_symbol_index_in_slot. The base station may also obtain the slot_id by detecting the time-frequency resources occupied by the random access preamble, and then query the above Table 2 according to the slot_id to obtain the corresponding start_symbol_index_in_slot. The base station calculates the RA-RNTI according to the detected slot_id and start_symbol_index_in_slot and based on the above formula (5), scrambles the CRC of the DCI of the terminal by using the RA-RNTI, and transmits the DCI through a random access response.

In S203, the terminal calculates the RA-RNTI according to the above formula (5), and descrambles the CRC of the received DCI by using the RA-RNTI, thereby decoding to obtain the DCI.

Second Scenario

This scenario describes an example of calculating the RA-RNTI by using the second method described above. The configuration table of the number of random access preambles as shown in Table 3 may be pre-configured at the base station and the terminal.

TABLE 3

| PRACH Configuration Index | Preamble Format (A1) | System frame number | slot_id (1~10) | sequence_id_per_slot (0~6) |
|---|---|---|---|---|
| 0 | A1 | Even | 1 | 0 |
| 1 | A1 | Even | 4 | 1 |
| 2 | A1 | Even | 7 | 2 |
| 3 | A1 | Any | 1 | 3 |
| 4 | A1 | Any | 4 | 4 |
| 5 | A1 | Any | 7 | 5 |
| 6 | A1 | Any | 1, 6 | 6 |
| 7 | A1 | Any | 2, 7 | 0 |
| 8 | A1 | Any | 3, 8 | 1 |
| ... | ... | ... | ... | ... |
| ... | ... | ... | ... | ... |
| ... | ... | ... | ... | ... |

The above Table 3 defines the slot occupied by the random access preamble and the index of the random access preamble sequence in the corresponding slot for the format A1 used by the random access preamble sequence.

The subcarrier spacing is 15 KHz as an example in this scenario, and in this case, N_slot_per_subframe=1 and N_symbol_per_slot=14. For the random access preamble sequence format A1, the number of OFDM symbols contained in each random access preamble sequence is N_OS=2, and the value range of sequence_id_per_slot is 0~6. In this way, the formula (3) is simplified as the following formula (6):

RA-RNTI=1+sequence_id_per_slot*2+slot_id*14+10*14*f_id.

Based on the process shown in FIG. 2, in this scenario the following steps are performed.

In S201, the terminal determines the random access preamble sequence in the format A1, and the terminal determines the slot occupied by the random access preamble according to Table 3, for example, the terminal may transmit the random access preamble sequence 0 in the format A1 in the slot 1 or the terminal may transmit the random access preamble sequence 1 in the format A1 in the slot 4.

In S202, the base station detects the time-frequency resources occupied by the random access preamble transmitted by the terminal to obtain the slot_id, and determines that the format of the random access preamble sequence is A1 according to the correspondence between the time-frequency resources occupied by the random access preamble and the random access preamble format (this correspondence is pre-configured or pre-agreed), and then looks for the above Table 3 according to the slot_id to obtain the corresponding sequence_id_per_slot. The base station calculates the RA-RNTI according to the detected slot_id and sequence_id_per_slot and based on the above formula (6), scrambles the CRC of the DCI of the terminal by using the RA-RNTI, and transmits the DCI through a random access response.

In S203, the terminal calculates the RA-RNTI according to the above formula (6), and descrambles the CRC of the received DCI by using the RA-RNTI, thereby decoding to obtain the DCI.

Third Scenario

This scenario describes an example of calculating the RA-RNTI by using the third method described above. The configuration table of the number of random access preambles as shown in Table 4 may be pre-configured at the base station and the terminal.

TABLE 4

| PRACH Configuration Index | Preamble Format (A0/A1/A2/A3/B1/B2/B3/B4/C0/C2) | System frame number | slot_id (1~10) | sequence_id_per_slot (0~6) |
|---|---|---|---|---|
| 0 | A1 | Even | 1 | 0 |
| 1 | A1 | Even | 4 | 1 |
| 2 | A1 | Even | 7 | 2 |
| 3 | A1 | Any | 1 | 3 |
| 4 | A1 | Any | 4 | 4 |
| 5 | A1 | Any | 7 | 5 |
| 6 | A1 | Any | 1, 6 | 6 |
| 7 | A1 | Any | 2, 7 | 0 |
| 8 | A1 | Any | 3, 8 | 1 |
| ... | ... | ... | ... | ... |
| ... | ... | ... | ... | ... |
| ... | ... | ... | ... | ... |

The above Table 4 defines the slot occupied by the random access preamble and the index of the random access preamble sequence in the corresponding slot for the format used by each random access preamble sequence.

The subcarrier spacing is 15 KHz as an example in this scenario, and in this case, N_slot_per_subframe=1 and N_symbol_per_slot=14. For the random access preamble sequence format A1, the number of random access preamble sequences contained in a slot is N_sequence_per_slot=7, and the value range of sequence_id_per_slot is 0~6. In this way, the formula (4) is simplified as the following formula (7):

RA-RNTI=1+sequence_id_per_slot+slot_id*7+ 10*14*$f$_id.

Based on the process shown in FIG. 2, in this scenario, the steps are as follows.

In S201, the terminal determines the random access preamble sequence in the format A1, and the terminal determines the slot occupied by the random access preamble according to Table 4, for example, the terminal may transmit the random access preamble sequence 0 in the format A1 in the slot 1 or transmit the random access preamble sequence 1 in the format A1 in the slot 4.

In S202, the base station detects the time-frequency resources occupied by the random access preamble transmitted by the terminal to obtain the slot_id, and determines that the format of the random access preamble sequence is A1 according to the correspondence between the time-frequency resources occupied by the random access preamble and the random access preamble format (this correspondence is pre-configured or pre-agreed), and then queries the above Table 4 according to the slot_id to obtain the corresponding sequence_id_per_slot. The base station calculates the RA-RNTI according to the detected slot_id and sequence_id_per_slot and based on the above formula (7), scrambles the CRC of the DCI of the terminal by using the RA-RNTI, and transmits the DCI through a random access response.

In S203, the terminal calculates the RA-RNTI according to the above formula (7), and descrambles the CRC of the received DCI by using the RA-RNTI, thereby decoding to obtain the DCI.

In the above embodiments of the present application, the RA-RNTI may be determined according to the time-frequency resources occupied by the random access preamble, and the time-frequency resources are the time-frequency resources in symbol level. Since the RA-RNTI is calculated based on the time-frequency resources in symbol level occupied by the random access preamble, for the NR system, the time interval of the random access preamble may be based on the symbol level in many cases of the preamble format of the short sequence and the subcarrier spacing, implementing the determination of the RA-RNTI in the random access process of the NR system.

Through the above embodiments of the present application, it may be ensured that the random access mechanism of the 5G NR can operate normally. Especially for the random access preamble format of the NR short sequence (L=139 or 127), a slot may contain multiple random access preamble sequences, and the number of slots contained in a radio frame varies for different subcarrier spacings, so the solution is proposed for the problem that it is impossible to calculate the RA-RNTI using the formula in the existing LTE system.

Based on the same technical concept, an embodiment of the present application further provides a base station, which can implement the functions of the base station side in the above embodiments.

Figure 3:
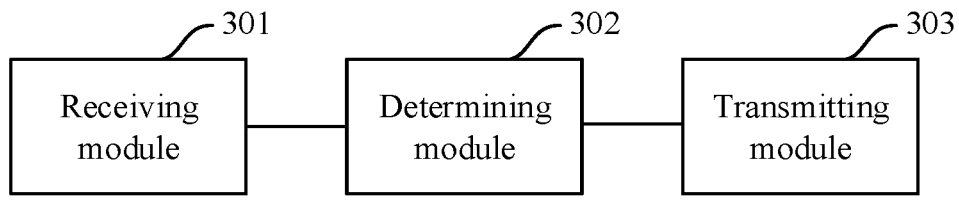
FIG. 3 is a schematic structural diagram of a base station in accordance with an embodiment of the present application.

Referring to FIG. 3, it is a schematic structural diagram of a base station according to an embodiment of the present application. As shown, the base station may include: a receiving module 301, a determining module 302, and a transmitting module 303, wherein:

the receiving module 301 is configured to receive a random access preamble transmitted by a terminal; the determining module 302 is configured to determine an RA-RNTI according to the time-frequency resources occupied by the random access preamble, wherein the time-frequency resources are the time-frequency resources in OFDM symbol level; and the transmitting module 303 is configured to transmit a random access response message, wherein the random access response message includes the downlink control information allocated by the base station for the terminal, and the downlink control information is scrambled by using the RA-RNTI.

In one embodiment, the RA-RNTI is determined according to time domain resource related parameters and frequency domain resource related parameters of the time-frequency resources occupied by the preamble;

wherein the time domain resource related parameters include: the index of the first OFDM symbol occupied by the random access preamble in its slot, and the index of the slot occupied by the random access preamble in its radio frame;

the frequency domain resource related parameters include: the index of the frequency domain bandwidth occupied by a PRACH corrected based on a coefficient; the coefficient is determined according to the number of slots in a subframe and the number of OFDM symbols in a slot, and the PRACH is used to transmit the random access preamble.

In one embodiment, the calculation formula of the RA-RNTI is:

RA-RNTI=1+start_symbol_index_in_slot+ slot_id*$N$_symbol_per_slot+ 10*$N$_slot_per_subframe*$N$_symbol_per_slot*$f$_id wherein:

start_symbol_index_in_slot is the index of the first OFDM symbol occupied by the random access preamble in its slot;

slot_id is the index of the slot occupied by the random access preamble in its radio frame;

N_symbol_per_slot represents the number of OFDM symbols in a slot;

N_slot_per_subframe represents the number of slots in a subframe;

f_id is the index of a frequency domain bandwidth occupied by a PRACH.

In one embodiment, the RA-RNTI is determined according to time domain resource related parameters and frequency domain resource related parameters of the time-frequency resources occupied by the preamble;

wherein the time domain resource related parameters include: the index of the random access preamble sequence in the slot occupied by the random access preamble, the number of OFDM symbols contained in the random access preamble sequence, and the index of the slot occupied by the random access preamble in its radio frame, wherein the index of the first OFDM symbol occupied by the random access preamble in its slot corresponds to the slot occupied by the random access preamble, and the number of OFDM symbols contained in the random access preamble sequence corresponds to the format of the random access preamble sequence;

the frequency domain resource related parameters include: the index of the frequency domain bandwidth occupied by a PRACH corrected based on a coefficient; the coefficient is determined according to the number of slots in a subframe and the number of OFDM symbols in a slot, and the PRACH is used to transmit the random access preamble.

In one embodiment, the calculation formula of the RA-RNTI is:

$$\text{RA-RNTI} = 1 + \text{sequence\_id\_per\_slot} * N\_OS + \text{slot\_id} * N\_\text{symbol\_per\_slot} + 10 * N\_\text{slot\_per\_subframe} * N\_\text{symbol\_per\_slot} * f\_id$$

wherein:

sequence_id_per_slot is the index of the random access preamble sequence in the slot occupied by the random access preamble; wherein the correspondence between the slots and the indexes of the random access preambles is pre-configured or pre-agreed;

N_OS is the number of OFDM symbols contained in a random access preamble sequence; wherein the N_OS is pre-configured or pre-agreed, and different random access preamble sequences correspond to different N_OSs;

slot_id is the index of the slot occupied by the random access preamble in its radio frame;

N_symbol_per_slot represents the number of OFDM symbols in a slot;

N_slot_per_subframe represents the number of slots in a subframe;

f_id is the index of the frequency domain bandwidth occupied by a PRACH.

In one embodiment, the RA-RNTI is determined according to time domain resource related parameters and frequency domain resource related parameters of the time-frequency resources occupied by the preamble;

wherein the time domain resource related parameters include: the index of the random access preamble sequence in the slot occupied by the random access preamble, the total number of random access preamble sequences in the slot occupied by the random access preamble, and the index of the slot occupied by the random access preamble in its radio frame, wherein the index of the first OFDM symbol occupied by the random access preamble in its slot corresponds to the slot occupied by the random access preamble, and the total number of random access preamble sequences in the slot occupied by the random access preamble corresponds to the slot index;

the frequency domain resource related parameters include: the index of the frequency domain bandwidth occupied by a PRACH corrected based on a coefficient; the coefficient is determined according to the number of slots in a subframe and the number of OFDM symbols in a slot, and the PRACH is used to transmit the random access preamble.

In one embodiment, the calculation formula of the RA-RNTI is:

$$\text{RA-RNTI} = 1 + \text{sequence\_id\_per\_slot} + \text{slot\_id} * N\_\text{sequence\_per\_slot} + 10 * N\_\text{slot\_per\_subframe} * N\_\text{symbol\_per\_slot} * f\_id$$

wherein:

sequence_id_per_slot is the index of the random access preamble sequence in the slot occupied by the random access preamble; wherein the correspondence between the slots and the indexes of the random access preambles is pre-configured or pre-agreed;

N_sequence_per_slot is the total number of random access preamble sequences in the slot occupied by the random access preamble; wherein N_sequence_per_slot corresponds to the slot, and the total number of random access preamble sequences in a slot is pre-configured or pre-agreed;

slot_id is the index of the slot occupied by the random access preamble in its radio frame;

N_symbol_per_slot represents the number of OFDM symbols in a slot;

N_slot_per_subframe represents the number of slots in a subframe;

f_id is the index of the frequency domain bandwidth occupied by a PRACH.

Based on the same technical concept, an embodiment of the present application further provides a terminal, which can implement the functions of the terminal side in the above embodiments.

Figure 4:
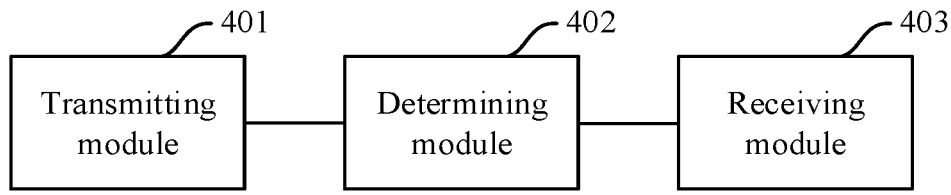
FIG. 4 is a schematic structural diagram of a terminal in accordance with an embodiment of the present application.

Referring to FIG. 4, it is a schematic structural diagram of a terminal according to an embodiment of the present application. As shown, the terminal may include: a transmitting module 401, a determining module 402, and a receiving module 403, wherein:

the transmitting module 401 is configured to transmit a random access preamble sequence to a base station; the determining module 402 is configured to determine an RA-RNTI according to the time-frequency resources occupied by the random access preamble sequence, wherein the time-frequency resources are the time-frequency resources in OFDM symbol level; and the receiving module 403 is configured to receive a random access response message transmitted by the base station, and descramble the downlink control information contained in the random access response message by using the RA-RNTI.

In one embodiment, the RA-RNTI is determined according to time domain resource related parameters and frequency domain resource related parameters of the time-frequency resources occupied by the preamble;

wherein the time domain resource related parameters include: the index of the first OFDM symbol occupied by the random access preamble in its slot, and the index of the slot occupied by the random access preamble in its radio frame;

the frequency domain resource related parameters include: the index of the frequency domain bandwidth occupied by a PRACH corrected based on a coefficient; the coefficient is determined according to the number of slots in a subframe and the number of OFDM symbols in a slot, and the PRACH is used to transmit the random access preamble.

In one embodiment, the calculation formula of the RA-RNTI is:

$$\text{RA-RNTI} = 1 + \text{start\_symbol\_index\_in\_slot} + \text{slot\_id} * N\_\text{symbol\_per\_slot} + 10 * N\_\text{slot\_per\_subframe} * N\_\text{symbol\_per\_slot} * f\_id$$

wherein:

start_symbol_index_in_slot is the index of the first OFDM symbol occupied by the random access preamble in its slot;

slot_id is the index of the slot occupied by the random access preamble in its radio frame;

N_symbol_per_slot represents the number of OFDM symbols in a slot;

N_slot_per_subframe represents the number of slots in a subframe;

f_id is the index of the frequency domain bandwidth occupied by a PRACH.

In one embodiment, the RA-RNTI is determined according to time domain resource related parameters and frequency domain resource related parameters of the time-frequency resources occupied by the preamble;

wherein the time domain resource related parameters include: the index of the random access preamble sequence in the slot occupied by the random access preamble, the number of OFDM symbols contained in the random access preamble sequence, and the index of the slot occupied by the random access preamble in its radio frame, wherein the index of the first OFDM symbol occupied by the random access preamble in its slot corresponds to the slot occupied by the random access preamble, and the number of OFDM symbols contained in the random access preamble sequence corresponds to the format of the random access preamble sequence;

the frequency domain resource related parameters include: the index of the frequency domain bandwidth occupied by a PRACH corrected based on a coefficient; the coefficient is determined according to the number of slots in a subframe and the number of OFDM symbols in a slot, and the PRACH is used to transmit the random access preamble.

In one embodiment, the calculation formula of the RA-RNTI is:

$$\text{RA-RNTI}=1+\text{sequence\_id\_per\_slot}*N\_OS+\\ \text{slot\_id}*N\_\text{symbol\_per\_slot}+\\ 10*N\_\text{slot\_per\_subframe}*N\_\text{symbol\_per\_slot}*f\_id$$

wherein:

sequence_id_per_slot is the index of the random access preamble sequence in the slot occupied by the random access preamble; wherein the correspondence between the slots and the indexes of the random access preambles is pre-configured or pre-agreed;

N_OS is the number of OFDM symbols contained in a random access preamble sequence; wherein the N_OS is pre-configured or pre-agreed, and different random access preamble sequences correspond to different N_OSs;

slot_id is the index of the slot occupied by the random access preamble in its radio frame;

N_symbol_per_slot represents the number of OFDM symbols in a slot;

N_slot_per_subframe represents the number of slots in a subframe;

f_id is the index of the frequency domain bandwidth occupied by a PRACH.

In one embodiment, the RA-RNTI is determined according to time domain resource related parameters and frequency domain resource related parameters of the time-frequency resources occupied by the preamble;

wherein the time domain resource related parameters include: the index of the random access preamble sequence in the slot occupied by the random access preamble, the total number of random access preamble sequences in the slot occupied by the random access preamble, and the index of the slot occupied by the random access preamble in its radio frame, wherein the index of the first OFDM symbol occupied by the random access preamble in its slot corresponds to the slot occupied by the random access preamble, and the total number of random access preamble sequences in the slot occupied by the random access preamble corresponds to the slot index;

the frequency domain resource related parameters include: the index of the frequency domain bandwidth occupied by a PRACH corrected based on a coefficient; the coefficient is determined according to the number of slots in a subframe and the number of OFDM symbols in a slot, and the PRACH is used to transmit the random access preamble.

In one embodiment, the calculation formula of the RA-RNTI is:

$$\text{RA-RNTI}=1+\text{sequence\_id\_per\_slot}+\\ \text{slot\_id}*N\_\text{sequence\_per\_slot}+\\ 10*N\_\text{slot\_per\_subframe}*N\_\text{symbol\_per\_slot}*f\_id$$

wherein:

sequence_id_per_slot is the index of the random access preamble sequence in the slot occupied by the random access preamble; wherein the correspondence between the slots and the indexes of the random access preambles is pre-configured or pre-agreed;

N_sequence_per_slot is the total number of random access preamble sequences in the slot occupied by the random access preamble; wherein N_sequence_per_slot corresponds to the slot, and the total number of random access preamble sequences in a slot is pre-configured or pre-agreed;

slot_id is the index of the slot occupied by the random access preamble in its radio frame;

N_symbol_per_slot represents the number of OFDM symbols in a slot;

N_slot_per_subframe represents the number of slots in a subframe;

f_id is the index of the frequency domain bandwidth occupied by a PRACH.

Based on the same technical concept, an embodiment of the present application further provides a communication device, which can implement the functions of the base station side in the above embodiments.

Figure 5:
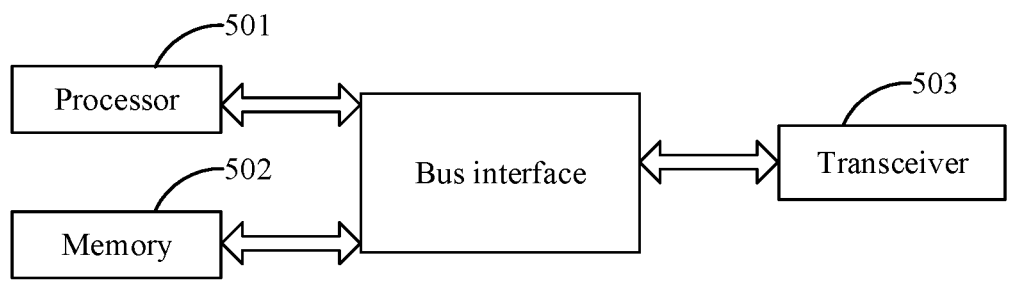
FIG. 5 is a schematic structural diagram of a communication device in accordance with an embodiment of the present application.

Referring to FIG. 5, it is a schematic structural diagram of a communication device according to an embodiment of the present application. As shown, the communication device may include: a processor 501, a memory 502, a transceiver 503, and a bus interface.

The processor 501 is responsible for managing the bus architecture and general processing, and the memory 502 may store the data used by the processor 501 when performing the operations. The transceiver 503 is configured to receive and transmit the data under the control of the processor 501.

The bus architecture may include any numbers of interconnected buses and bridges, and specifically link various circuits of one or more processors represented by the processor 501 and the memory represented by the memory 502. The bus architecture may further link various other circuits such as peripheral device, voltage regulator and power management circuit, which are all well known in the art and thus will not be further described again herein. The bus interface provides an interface. The processor 501 is responsible for managing the bus architecture and general processing, and the memory 502 may store the data used by the processor 501 when performing the operations.

The flow disclosed by the embodiment of the present application may be applied in the processor 501 or implemented by the processor 501. In the implementation process, each step of the signal processing flow may be completed by the integrated logic circuit of hardware in the processor 501 or the instructions in the form of software. The processor 501 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 502, and the processor 501 reads the information in the memory 502 and completes the steps of the signal processing flow in combination with its hardware.

Specifically, the processor 501 is configured to read the programs in the memory 502 and perform the process of: receiving a random access preamble transmitted by a terminal via the transceiver; determining an RA-RNTI according to the time-frequency resources occupied by the random access preamble, wherein the time-frequency resources are the time-frequency resources in OFDM symbol level; and transmitting a random access response message via the transceiver, wherein the random access response message includes the downlink control information allocated by the base station for the terminal, and the downlink control information is scrambled by using the RA-RNTI.

In one embodiment, the RA-RNTI is determined according to time domain resource related parameters and frequency domain resource related parameters of the time-frequency resources occupied by the preamble;

wherein the time domain resource related parameters include: the index of the first OFDM symbol occupied by the random access preamble in its slot, and the index of the slot occupied by the random access preamble in its radio frame;

the frequency domain resource related parameters include: the index of the frequency domain bandwidth occupied by a PRACH corrected based on a coefficient; the coefficient is determined according to the number of slots in a subframe and the number of OFDM symbols in a slot, and the PRACH is used to transmit the random access preamble.

In one embodiment, the calculation formula of the RA-RNTI is:

$$\text{RA-RNTI}=1+\text{start\_symbol\_index\_in\_slot}+\text{slot\_id}*N\_\text{symbol\_per\_slot}+10*N\_\text{slot\_per\_subframe}*N\_\text{symbol\_per\_slot}*f\_\text{id}$$

wherein:

start_symbol_index_in_slot is the index of the first OFDM symbol occupied by the random access preamble in its slot;

slot_id is the index of the slot occupied by the random access preamble in its radio frame;

N_symbol_per_slot represents the number of OFDM symbols in a slot;

N_slot_per_subframe represents the number of slots in a subframe;

f_id is the index of the frequency domain bandwidth occupied by a PRACH.

In one embodiment, the RA-RNTI is determined according to time domain resource related parameters and frequency domain resource related parameters of the time-frequency resources occupied by the preamble;

wherein the time domain resource related parameters include: the index of the random access preamble sequence in the slot occupied by the random access preamble, the number of OFDM symbols contained in the random access preamble sequence, and the index of the slot occupied by the random access preamble in its radio frame, wherein the index of the first OFDM symbol occupied by the random access preamble in its slot corresponds to the slot occupied by the random access preamble, and the number of OFDM symbols contained in the random access preamble sequence corresponds to the format of the random access preamble sequence;

the frequency domain resource related parameters include: the index of the frequency domain bandwidth occupied by a PRACH corrected based on a coefficient; the coefficient is determined according to the number of slots in a subframe and the number of OFDM symbols in a slot, and the PRACH is used to transmit the random access preamble.

In one embodiment, the calculation formula of the RA-RNTI is:

$$\text{RA-RNTI}=1+\text{sequence\_id\_per\_slot}*N\_OS+\text{slot\_id}*N\_\text{symbol\_per\_slot}+10*N\_\text{slot\_per\_subframe}*N\_\text{symbol\_per\_slot}*f\_\text{id}$$

wherein:

sequence_id_per_slot is the index of the random access preamble sequence in the slot occupied by the random access preamble; wherein the correspondence between the slots and the indexes of the random access preambles is pre-configured or pre-agreed;

N_OS is the number of OFDM symbols contained in a random access preamble sequence; wherein the N_OS is pre-configured or pre-agreed, and different random access preamble sequences correspond to different N_OSs;

slot_id is the index of the slot occupied by the random access preamble in its radio frame;

N_symbol_per_slot represents the number of OFDM symbols in a slot;

N_slot_per_subframe represents the number of slots in a subframe;

f_id is the index of the frequency domain bandwidth occupied by a PRACH.

In one embodiment, the RA-RNTI is determined according to time domain resource related parameters and frequency domain resource related parameters of the time-frequency resources occupied by the preamble;

wherein the time domain resource related parameters include: the index of the random access preamble sequence in the slot occupied by the random access preamble, the total number of random access preamble sequences in the slot occupied by the random access preamble, and the index of the slot occupied by the random access preamble in its radio frame, wherein the index of the first OFDM symbol occupied by the random access preamble in its slot corresponds to the slot occupied by the random access preamble, and the total number of random access preamble sequences in the slot occupied by the random access preamble corresponds to the slot index;

the frequency domain resource related parameters include: the index of the frequency domain bandwidth occupied by a PRACH corrected based on a coefficient; the coefficient is determined according to the number of slots in a subframe and the number of OFDM symbols in a slot, and the PRACH is used to transmit the random access preamble.

In one embodiment, the calculation formula of the RA-RNTI is:

$$\text{RA-RNTI} = 1 + \text{sequence\_id\_per\_slot} + \text{slot\_id} * N\_\text{sequence\_per\_slot} + 10 * N\_\text{slot\_per\_subframe} * N\_\text{symbol\_per\_slot} * f\_\text{id}$$

wherein:

sequence_id_per_slot is the index of the random access preamble sequence in the slot occupied by the random access preamble; wherein the correspondence between the slots and the indexes of the random access preambles is pre-configured or pre-agreed;

N_sequence_per_slot is the total number of random access preamble sequences in the slot occupied by the random access preamble; wherein N_sequence_per_slot corresponds to the slot, and the total number of random access preamble sequences in a slot is pre-configured or pre-agreed;

slot_id is the index of the slot occupied by the random access preamble in its radio frame;

N_symbol_per_slot represents the number of OFDM symbols in a slot;

N_slot_per_subframe represents the number of slots in a subframe;

f_id is the index of the frequency domain bandwidth occupied by a PRACH.

Based on the same technical concept, an embodiment of the present application further provides a communication device, which can implement the functions of the terminal side in the above embodiments.

Figure 6:
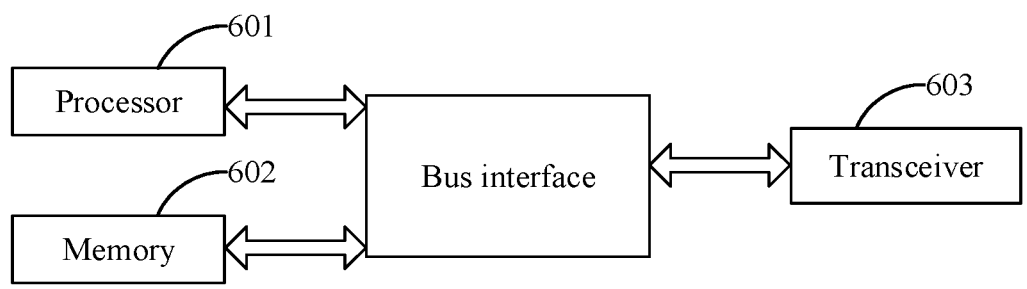
FIG. 6 is a schematic structural diagram of a communication device in accordance with another embodiment of the present application.

Referring to FIG. 6, it is a schematic structural diagram of a communication device according to an embodiment of the present application. As shown, the communication device may include: a processor 601, a memory 602, a transceiver 603, and a bus interface.

The processor 601 is responsible for managing the bus architecture and general processing, and the memory 602 may store the data used by the processor 601 when performing the operations. The transceiver 603 is configured to receive and transmit the data under the control of the processor 601.

The bus architecture may include any numbers of interconnected buses and bridges, and specifically link various circuits of one or more processors represented by the processor 601 and the memory represented by the memory 602. The bus architecture may further link various other circuits such as peripheral device, voltage regulator and power management circuit, which are all well known in the art and thus will not be further described again herein. The bus interface provides an interface. The processor 601 is responsible for managing the bus architecture and general processing, and the memory 602 may store the data used by the processor 601 when performing the operations.

The flow disclosed by the embodiment of the present application may be applied in the processor 601 or implemented by the processor 601. In the implementation process, each step of the signal processing flow may be completed by the integrated logic circuit of hardware in the processor 601 or the instructions in the form of software. The processor 601 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 602, and the processor 601 reads the information in the memory 602 and completes the steps of the signal processing flow in combination with its hardware.

Specifically, the processor 601 is configured to read the programs in the memory 602 and perform the process of: transmitting a random access preamble sequence to a base station via the transceiver; determining an RA-RNTI according to the time-frequency resources occupied by the random access preamble sequence, wherein the time-frequency resources are the time-frequency resources in OFDM symbol level; and receiving a random access response message transmitted by the base station via the transceiver, and descrambling the downlink control information contained in the random access response message by using the RA-RNTI.

In one embodiment, the RA-RNTI is determined according to time domain resource related parameters and frequency domain resource related parameters of the time-frequency resources occupied by the preamble;

wherein the time domain resource related parameters include: the index of the first OFDM symbol occupied by the random access preamble in its slot, and the index of the slot occupied by the random access preamble in its radio frame;

the frequency domain resource related parameters include: the index of the frequency domain bandwidth occupied by a PRACH corrected based on a coefficient; the coefficient is determined according to the number of slots in a subframe and the number of OFDM symbols in a slot, and the PRACH is used to transmit the random access preamble.

In one embodiment, the calculation formula of the RA-RNTI is:

$$\text{RA-RNTI} = 1 + \text{start\_symbol\_index\_in\_slot} + \text{slot\_id} * N\_\text{symbol\_per\_slot} + 10 * N\_\text{slot\_per\_subframe} * N\_\text{symbol\_per\_slot} * f\_\text{id}$$

wherein:

start_symbol_index_in_slot is the index of the first OFDM symbol occupied by the random access preamble in its slot;

slot_id is the index of the slot occupied by the random access preamble in its radio frame;

N_symbol_per_slot represents the number of OFDM symbols in a slot;

N_slot_per_subframe represents the number of slots in a subframe;

f_id is the index of the frequency domain bandwidth occupied by a PRACH.

In one embodiment, the RA-RNTI is determined according to time domain resource related parameters and frequency domain resource related parameters of the time-frequency resources occupied by the preamble;

wherein the time domain resource related parameters include: the index of the random access preamble sequence in the slot occupied by the random access preamble, the number of OFDM symbols contained in the random access preamble sequence, and the index of the slot occupied by the random access preamble in its radio frame, wherein the index of the first OFDM symbol occupied by the random access preamble in its slot corresponds to the slot occupied by the random access preamble, and the number of OFDM symbols contained in the random access preamble sequence corresponds to the format of the random access preamble sequence;

the frequency domain resource related parameters include: the index of the frequency domain bandwidth occupied by a PRACH corrected based on a coefficient; the coefficient is determined according to the number of slots in a subframe and the number of OFDM symbols in a slot, and the PRACH is used to transmit the random access preamble.

In one embodiment, the calculation formula of the RA-RNTI is:

$$RA\text{-}RNTI = 1 + sequence\_id\_per\_slot * N\_OS + slot\_id * N\_symbol\_per\_slot + 10 * N\_slot\_per\_subframe * N\_symbol\_per\_slot * f\_id$$

wherein:

sequence_id_per_slot is the index of the random access preamble sequence in the slot occupied by the random access preamble; wherein the correspondence between the slots and the indexes of the random access preambles is pre-configured or pre-agreed;

N_OS is the number of OFDM symbols contained in a random access preamble sequence; wherein the N_OS is pre-configured or pre-agreed, and different random access preamble sequences correspond to different N_OSs;

slot_id is the index of the slot occupied by the random access preamble in its radio frame;

N_symbol_per_slot represents the number of OFDM symbols in a slot;

N_slot_per_subframe represents the number of slots in a subframe;

f_id is the index of the frequency domain bandwidth occupied by a PRACH.

In one embodiment, the RA-RNTI is determined according to time domain resource related parameters and frequency domain resource related parameters of the time-frequency resources occupied by the preamble;

wherein the time domain resource related parameters include: the index of the random access preamble sequence in the slot occupied by the random access preamble, the total number of random access preamble sequences in the slot occupied by the random access preamble, and the index of the slot occupied by the random access preamble in its radio frame, wherein the index of the first OFDM symbol occupied by the random access preamble in its slot corresponds to the slot occupied by the random access preamble, and the total number of random access preamble sequences in the slot occupied by the random access preamble corresponds to the slot index;

the frequency domain resource related parameters include: the index of the frequency domain bandwidth occupied by a PRACH corrected based on a coefficient; the coefficient is determined according to the number of slots in a subframe and the number of OFDM symbols in a slot, and the PRACH is used to transmit the random access preamble.

In one embodiment, the calculation formula of the RA-RNTI is:

$$RA\text{-}RNTI = 1 + sequence\_id\_per\_slot + slot\_id * N\_sequence\_per\_slot + 10 * N\_slot\_per\_subframe * N\_symbol\_per\_slot * f\_id$$

wherein:

sequence_id_per_slot is the index of the random access preamble sequence in the slot occupied by the random access preamble; wherein the correspondence between the slots and the indexes of the random access preambles is pre-configured or pre-agreed;

N_sequence_per_slot is the total number of random access preamble sequences in the slot occupied by the random access preamble; wherein N_sequence_per_slot corresponds to the slot, and the total number of random access preamble sequences in a slot is pre-configured or pre-agreed;

slot_id is the index of the slot occupied by the random access preamble in its radio frame;

N_symbol_per_slot represents the number of OFDM symbols in a slot;

N_slot_per_subframe represents the number of slots in a subframe;

f_id is the index of the frequency domain bandwidth occupied by a PRACH.

Based on the same technical concept, an embodiment of the present application further provides a computer storage medium. The computer readable storage medium stores the computer executable instructions configured to cause the computer to perform the process performed by the base station side in the above embodiments.

Based on the same technical concept, an embodiment of the present application further provides a computer storage medium. The computer readable storage medium stores the computer executable instructions configured to cause the computer to perform the process performed by the terminal side in the above embodiments.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams may be implemented by the computer program instructions. These computer program instructions may be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions may also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although the embodiments of the present application have been described, those skilled in the art can make additional alterations and modifications to these embodiments once they learn about the basic creative concepts. Thus the attached claims are intended to be interpreted to include the embodiments as well as all the alterations and modifications falling within the scope of the present application.

Evidently those skilled in the art can make various modifications and variations to the present application without departing from the spirit and scope of the present application. Thus the present application is also intended to encompass these modifications and variations therein as long as these modifications and variations to the present application come into the scope of the claims of the present application and their equivalents.

What is claimed is:

1. A method for determining an RA-RNTI, comprising:
   determining, by a terminal, a Random Access-Radio Network Temporary Identifier, RA-RNTI, according to time-frequency resources occupied by a random access preamble sequence, wherein the time-frequency resources are time-frequency resources in Orthogonal Frequency Division Multiplexing, OFDM, symbol level;
   receiving, by the terminal, a random access response message transmitted by a base station, and descrambling downlink control information contained in the random access response message by using the RA-RNTI.

2. The method according to claim 1, wherein the RA-RNTI is determined according to time domain resource related parameters and frequency domain resource related parameters of the time-frequency resources occupied by the random access preamble;
   wherein the time domain resource related parameters comprise: an index of first OFDM symbol occupied by the random access preamble in its slot, and an index of a slot occupied by the random access preamble in its radio frame;
   the frequency domain resource related parameters comprise: an index of a frequency domain bandwidth occupied by a Physical Random Access CHannel, PRACH, corrected based on a coefficient; the coefficient is determined according to a number of slots in a subframe and a number of OFDM symbols in a slot, and the PRACH is used to transmit the random access preamble.

3. The method according to claim 1, wherein a calculation formula of the RA-RNTI is:

RA-RNTI=1+start_symbol_index_in_slot+
   slot_id*$N$_symbol_per_slot+
   10*$N$_slot_per_subframe*$N$_symbol_per_slot*$f$_id wherein:
   start_symbol_index_in_slot is an index of first OFDM symbol occupied by the random access preamble in its slot;
   slot_id is an index of first slot occupied by the random access preamble in its radio frame;
   N_symbol_per_slot represents a number of OFDM symbols in a slot;
   N_slot_per_subframe represents a number of slots in a subframe;
   f_id is an index of a frequency domain bandwidth occupied by a PRACH.

4. The method according to claim 1, wherein the RA-RNTI is determined according to time domain resource related parameters and frequency domain resource related parameters of the time-frequency resources occupied by the preamble;
   wherein the time domain resource related parameters comprise: the index of the random access preamble sequence in the slot occupied by the random access preamble, the number of OFDM symbols contained in the random access preamble sequence, and the index of the slot occupied by the random access preamble in its radio frame, wherein the index of the first OFDM symbol occupied by the random access preamble in its slot corresponds to the slot occupied by the random access preamble, and the number of OFDM symbols contained in the random access preamble sequence corresponds to the format of the random access preamble sequence;
   the frequency domain resource related parameters comprise: the index of the frequency domain bandwidth occupied by a PRACH corrected based on a coefficient; the coefficient is determined according to the number of slots in a subframe and the number of OFDM symbols in a slot, and the PRACH is used to transmit the random access preamble.

5. The method according to claim 1, wherein the calculation formula of the RA-RNTI is:

RA-RNTI=1+sequence_id_per_slot*$N$_OS+
   slot_id*$N$_symbol_per_slot+
   10*$N$_slot_per_subframe*$N$_symbol_per_slot*$f$_id wherein:
   sequence_id_per_slot is the index of the random access preamble sequence in the slot occupied by the random access preamble; wherein the correspondence between the slots and the indexes of the random access preambles is pre-configured or pre-agreed;
   N_OS is the number of OFDM symbols contained in a random access preamble sequence; wherein the N_OS is pre-configured or pre-agreed, and different random access preamble sequences correspond to different N_OSs;
   slot_id is the index of first slot occupied by the random access preamble in its radio frame;
   N_symbol_per_slot represents the number of OFDM symbols in a slot;
   N_slot_per_subframe represents the number of slots in a subframe;
   f_id is the index of the frequency domain bandwidth occupied by a PRACH.

6. The method according to claim 1, wherein the RA-RNTI is determined according to time domain resource related parameters and frequency domain resource related parameters of the time-frequency resources occupied by the preamble;
   wherein the time domain resource related parameters comprise: the index of the random access preamble sequence in the slot occupied by the random access preamble, the total number of random access preamble sequences in the slot occupied by the random access preamble, and the index of the slot occupied by the random access preamble in its radio frame, wherein the index of the first OFDM symbol occupied by the random access preamble in its slot corresponds to the slot occupied by the random access preamble, and the total number of random access preamble sequences in the slot occupied by the random access preamble corresponds to the slot index;
   the frequency domain resource related parameters comprise: the index of the frequency domain bandwidth occupied by a PRACH corrected based on a coefficient; the coefficient is determined according to the number of slots in a subframe and the number of OFDM symbols in a slot, and the PRACH is used to transmit the random access preamble.

7. The method according to claim 1, wherein the calculation formula of the RA-RNTI is:

$$RA\text{-}RNTI = 1 + sequence\_id\_per\_slot + \\ slot\_id*N\_sequence\_per\_slot + \\ 10*N\_slot\_per\_subframe*N\_symbol\_per\_slot*f\_id$$

wherein:
sequence_id_per_slot is the index of the random access preamble sequence in the slot occupied by the random access preamble; wherein the correspondence between the slots and the indexes of the random access preambles is pre-configured or pre-agreed;
N_sequence_per_slot is the total number of random access preamble sequences in the slot occupied by the random access preamble; wherein N_sequence_per_slot corresponds to the slot, and the total number of random access preamble sequences in a slot is pre-configured or pre-agreed;
slot_id is the index of first slot occupied by the random access preamble in its radio frame;
N_symbol_per_slot represents the number of OFDM symbols in a slot;
N_slot_per_subframe represents the number of slots in a subframe;
f_id is the index of the frequency domain bandwidth occupied by a PRACH.

8. A method for determining an RA-RNTI, comprising:
determining, by a base station, a Random Access-Radio Network Temporary Identifier, RA-RNTI, according to time-frequency resources occupied by a random access preamble transmitted by a terminal, wherein the time-frequency resources are time-frequency resources in Orthogonal Frequency Division Multiplexing, OFDM, symbol level;
transmitting, by the base station, a random access response message, wherein the random access response message comprises downlink control information allocated by the base station for the terminal, and the downlink control information is scrambled by using the RA-RNTI.

9. The method according to claim 8, wherein the RA-RNTI is determined according to time domain resource related parameters and frequency domain resource related parameters of the time-frequency resources occupied by the random access preamble;
wherein the time domain resource related parameters comprise: an index of first OFDM symbol occupied by the random access preamble in its slot, and an index of a slot occupied by the random access preamble in its radio frame;
the frequency domain resource related parameters comprise: an index of a frequency domain bandwidth occupied by a Physical Random Access CHannel, PRACH, corrected based on a coefficient; the coefficient is determined according to a number of slots in a subframe and a number of OFDM symbols in a slot, and the PRACH is used to transmit the random access preamble.

10. The method according to claim 8, wherein a calculation formula of the RA-RNTI is:

$$RA\text{-}RNTI = 1 + start\_symbol\_index\_in\_slot + \\ slot\_id*N\_symbol\_per\_slot + \\ 10*N\_slot\_per\_subframe*N\_symbol\_per\_slot*f\_id$$

wherein:
start_symbol_index_in_slot is an index of first OFDM symbol occupied by the random access preamble in its slot;
slot_id is an index of first slot occupied by the random access preamble in its radio frame;
N_symbol_per_slot represents a number of OFDM symbols in a slot;
N_slot_per_subframe represents a number of slots in a subframe;
f_id is an index of a frequency domain bandwidth occupied by a PRACH.

11. The method according to claim 8, wherein the RA-RNTI is determined according to time domain resource related parameters and frequency domain resource related parameters of the time-frequency resources occupied by the preamble;
wherein the time domain resource related parameters comprise: the index of the random access preamble sequence in the slot occupied by the random access preamble, the number of OFDM symbols contained in the random access preamble sequence, and the index of the slot occupied by the random access preamble in its radio frame, wherein the index of the first OFDM symbol occupied by the random access preamble in its slot corresponds to the slot occupied by the random access preamble, and the number of OFDM symbols contained in the random access preamble sequence corresponds to the format of the random access preamble sequence;
the frequency domain resource related parameters comprise: the index of the frequency domain bandwidth occupied by a PRACH corrected based on a coefficient; the coefficient is determined according to the number of slots in a subframe and the number of OFDM symbols in a slot, and the PRACH is used to transmit the random access preamble.

12. The method according to claim 8, wherein the calculation formula of the RA-RNTI is:

$$RA\text{-}RNTI = 1 + sequence\_id\_per\_slot*N\_OS + \\ slot\_id*N\_symbol\_per\_slot + \\ 10*N\_slot\_per\_subframe*N\_symbol\_per\_slot*f\_id$$

wherein:
sequence_id_per_slot is the index of the random access preamble sequence in the slot occupied by the random access preamble; wherein the correspondence between the slots and the indexes of the random access preambles is pre-configured or pre-agreed;
N_OS is the number of OFDM symbols contained in a random access preamble sequence; wherein the N_OS is pre-configured or pre-agreed, and different random access preamble sequences correspond to different N_OSs;
slot_id is the index of first slot occupied by the random access preamble in its radio frame;
N_symbol_per_slot represents the number of OFDM symbols in a slot;
N_slot_per_subframe represents the number of slots in a subframe;
f_id is the index of the frequency domain bandwidth occupied by a PRACH.

13. A communication device, comprising:
a processor and a memory, wherein the processor is configured, when executing a computer program stored in the memory, to implement the process of:
determining, by a terminal, a Random Access-Radio Network Temporary Identifier, RA-RNTI, according to time-frequency resources occupied by a random access preamble sequence, wherein the time-frequency resources are time-frequency resources in Orthogonal Frequency Division Multiplexing, OFDM, symbol level;

receiving, by the terminal, a random access response message transmitted by the base station, and descrambling downlink control information contained in the random access response message by using the RA-RNTI.

14. The communication device according to claim 13, wherein the RA-RNTI is determined according to time domain resource related parameters and frequency domain resource related parameters of the time-frequency resources occupied by the random access preamble;

wherein the time domain resource related parameters comprise: an index of first OFDM symbol occupied by the random access preamble in its slot, and an index of a slot occupied by the random access preamble in its radio frame;

the frequency domain resource related parameters comprise: an index of a frequency domain bandwidth occupied by a Physical Random Access CHannel, PRACH, corrected based on a coefficient; the coefficient is determined according to a number of slots in a subframe and a number of OFDM symbols in a slot, and the PRACH is used to transmit the random access preamble.

15. The communication device according to claim 13, wherein a calculation formula of the RA-RNTI is:

$$RA\text{-}RNTI=1+start\_symbol\_index\_in\_slot+\\slot\_id*N\_symbol\_per\_slot+\\10*N\_slot\_per\_subframe*N\_symbol\_per\_slot*f\_id$$

wherein:

start_symbol_index_in_slot is an index of first OFDM symbol occupied by the random access preamble in its slot;

slot_id is an index of first slot occupied by the random access preamble in its radio frame;

N_symbol_per_slot represents a number of OFDM symbols in a slot;

N_slot_per_subframe represents a number of slots in a subframe;

f_id is an index of a frequency domain bandwidth occupied by a PRACH.

16. A communication device, comprising:

a processor, a memory, a transceiver and a bus interface; the processor is configured to read programs in the memory and perform the method of claim 8.

17. The communication device according to claim 16, wherein the RA-RNTI is determined according to time domain resource related parameters and frequency domain resource related parameters of the time-frequency resources occupied by the random access preamble;

wherein the time domain resource related parameters comprise: an index of first OFDM symbol occupied by the random access preamble in its slot, and an index of a slot occupied by the random access preamble in its radio frame;

the frequency domain resource related parameters comprise: an index of a frequency domain bandwidth occupied by a Physical Random Access CHannel, PRACH, corrected based on a coefficient; the coefficient is determined according to a number of slots in a subframe and a number of OFDM symbols in a slot, and the PRACH is used to transmit the random access preamble.

18. The communication device according to claim 16, wherein a calculation formula of the RA-RNTI is:

$$RA\text{-}RNTI=1+start\_symbol\_index\_in\_slot+\\slot\_id*N\_symbol\_per\_slot+\\10*N\_slot\_per\_subframe*N\_symbol\_per\_slot*f\_id$$

wherein:

start_symbol_index_in_slot is an index of first OFDM symbol occupied by the random access preamble in its slot;

slot_id is an index of first slot occupied by the random access preamble in its radio frame;

N_symbol_per_slot represents a number of OFDM symbols in a slot;

N_slot_per_subframe represents a number of slots in a subframe;

f_id is an index of a frequency domain bandwidth occupied by a PRACH.

19. A computer storage medium storing computer executable instructions configured to cause a computer to perform the method of claim 1.

20. A computer storage medium storing computer executable instructions configured to cause the computer to perform the method of claim 8.

* * * * *